United States Patent [19]

Kratky

[11] 3,960,113

[45] June 1, 1976

[54] ANIMAL RESTRAINT

[75] Inventor: Frank Kratky, Bellvue, Colo.

[73] Assignee: Westguard Products, Inc., Fort Collins, Colo.

[22] Filed: Mar. 17, 1975

[21] Appl. No.: 558,668

[52] U.S. Cl. .................................. 119/99; 119/103
[51] Int. Cl.² ........................................... A01K 1/06
[58] Field of Search ................ 119/98, 99, 103, 149

[56] References Cited
UNITED STATES PATENTS

| | | | |
|---|---|---|---|
| 2,674,980 | 4/1954 | Bentley | 119/103 |
| 2,967,510 | 1/1961 | Stoody | 119/103 |
| 3,099,249 | 7/1963 | Newhouse, Jr. | 119/99 |
| 3,814,060 | 6/1974 | Swenson | 119/98 |

Primary Examiner—J. N. Eskovitz
Attorney, Agent, or Firm—Hugh H. Drake

[57] ABSTRACT

An animal restraint features a headgate in which a pair of generally upright elongated pipes are spaced apart somewhat greater than the width of at least the head of the animal to be restrained. The pipes are mounted to permit rotation of each pipe about its longitudinal axis. A first spur gear is mounted on one of the pipes, while a second spur gear mounted on the other of the pipes is aligned and sized with respect to the first so that they intermesh in a manner that each is slaved to the other. A pair of elongated tubes are secured at one end to the associated pipes in generally-parallel spaced relationship with the other or upper ends of the tubes being movable toward and away from the respective pipes. At its upper end, at least one of the tubes is urged away from its associated pipe. The assemblies of the pipes and tubes are releasably latched in a manner that the tubes are positioned between the pipes so as to captivate the neck of the animal. Preferably associated with the foregoing restraint is a bench over which a table is tiltable. A clamping frame is associated with the table in a manner to squeeze the body of the animal.

10 Claims, 13 Drawing Figures

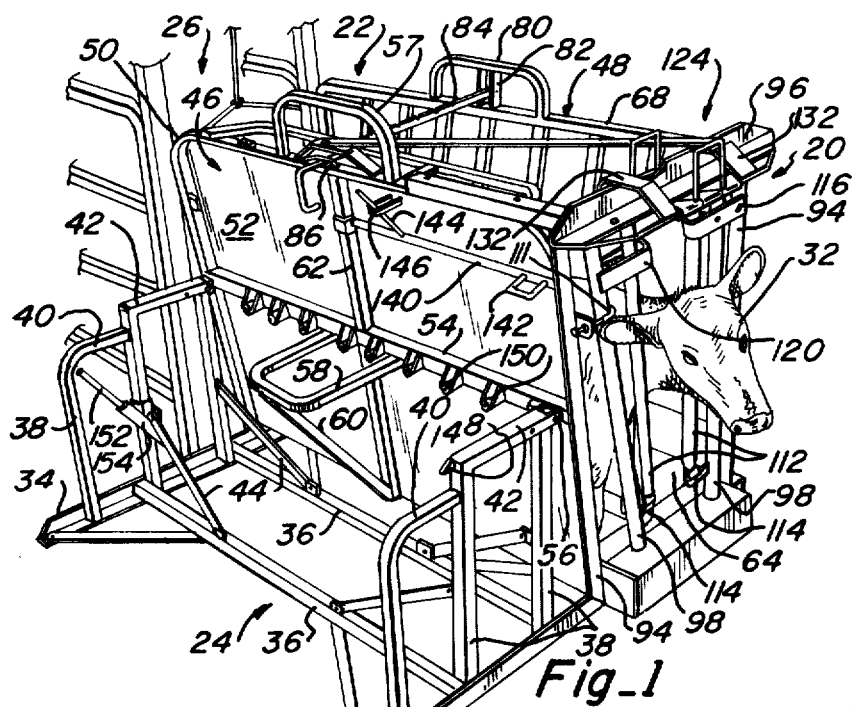
Fig_1
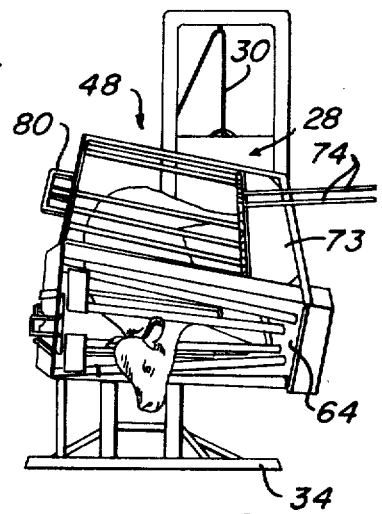
Fig_2
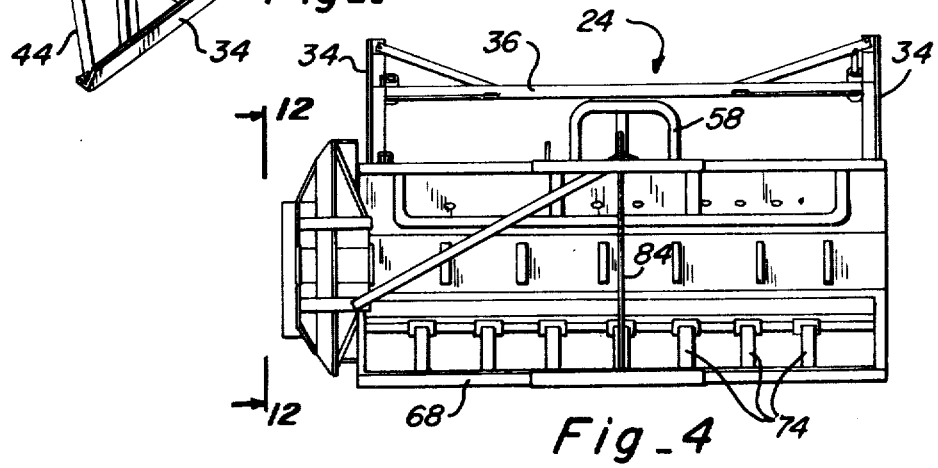
Fig_4
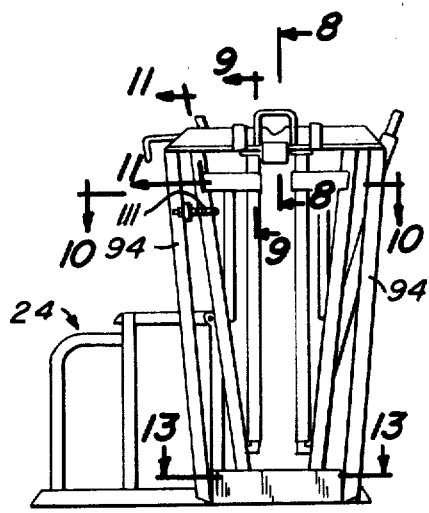
Fig_3
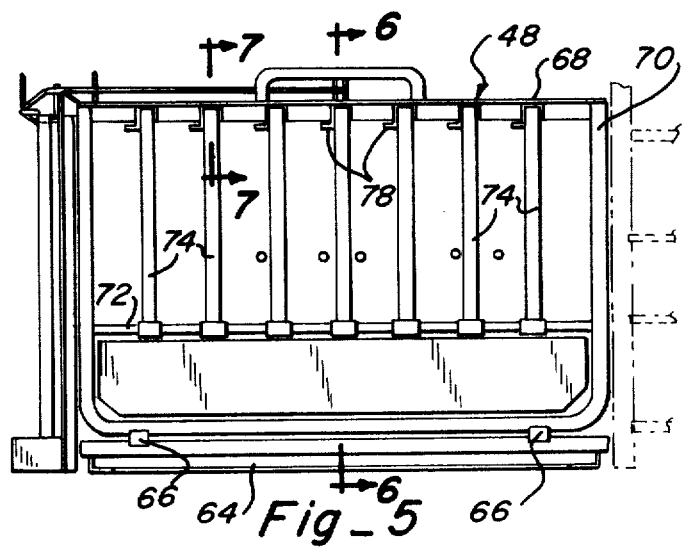
Fig_5

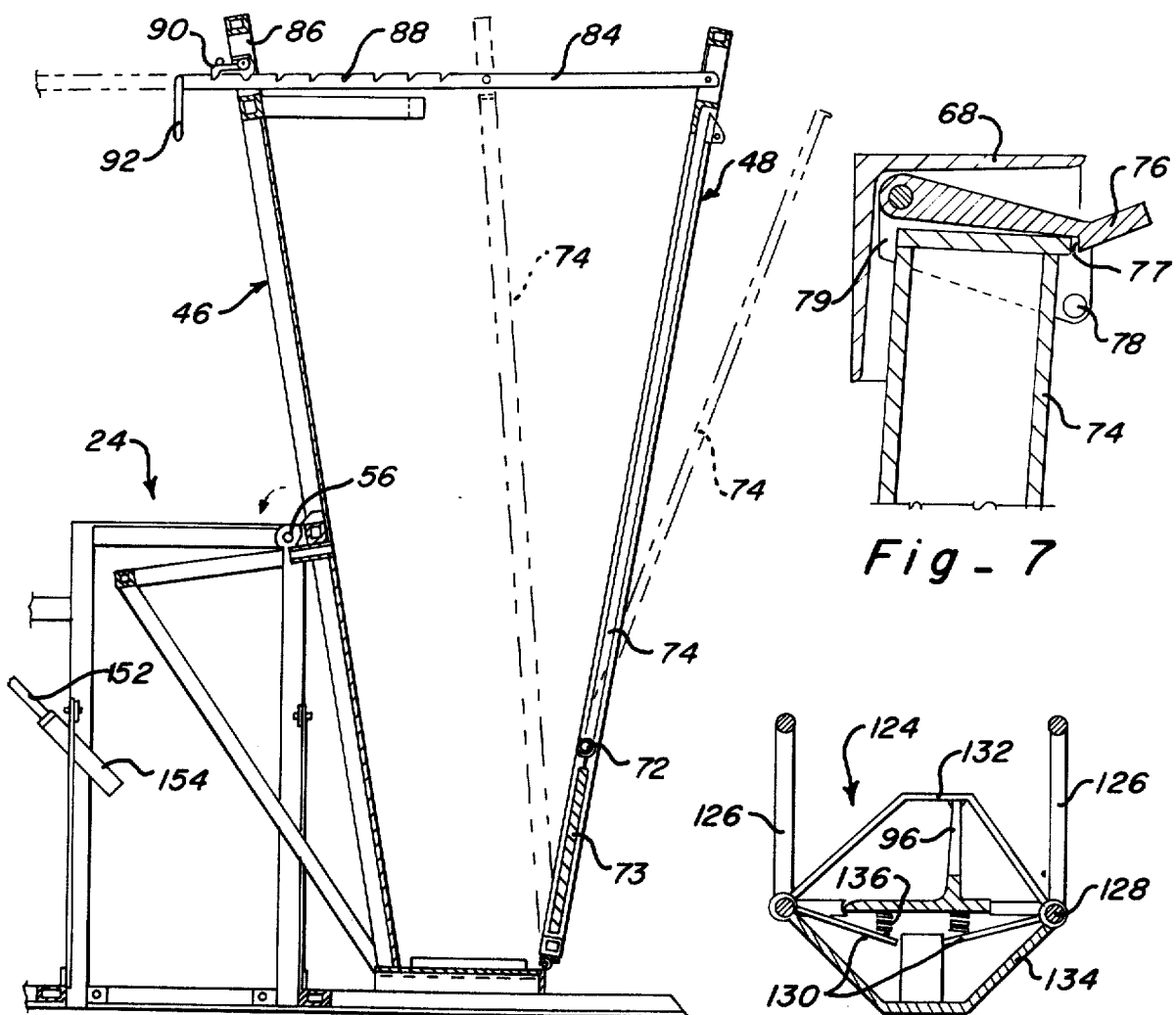
Fig_6
Fig_7
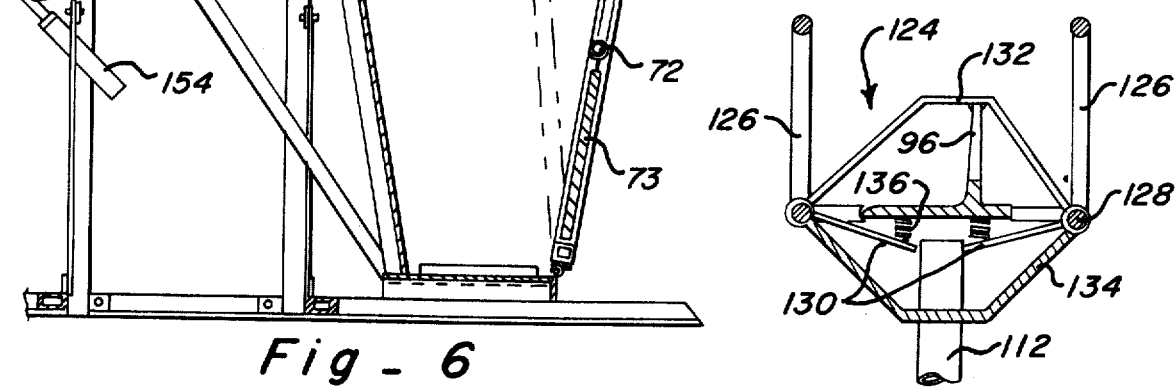
Fig_8
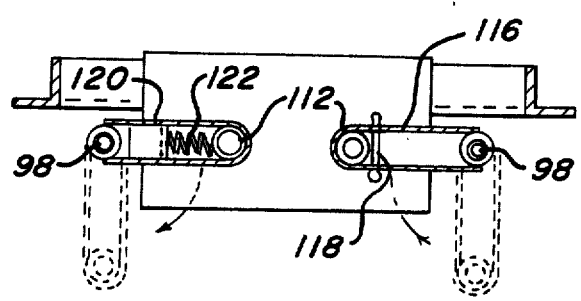
Fig_10
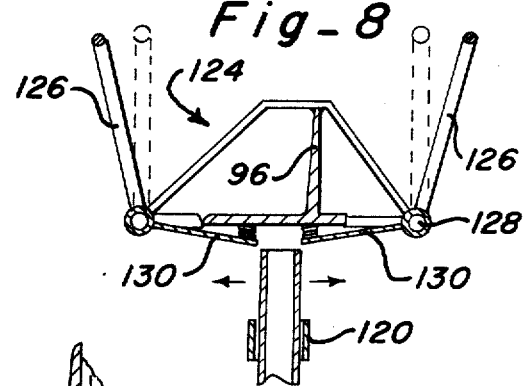
Fig_9
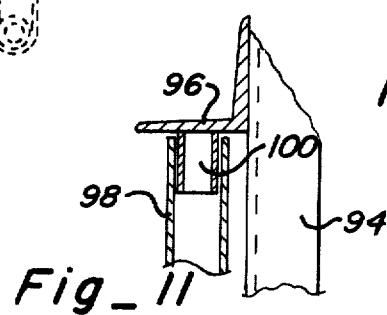
Fig_11

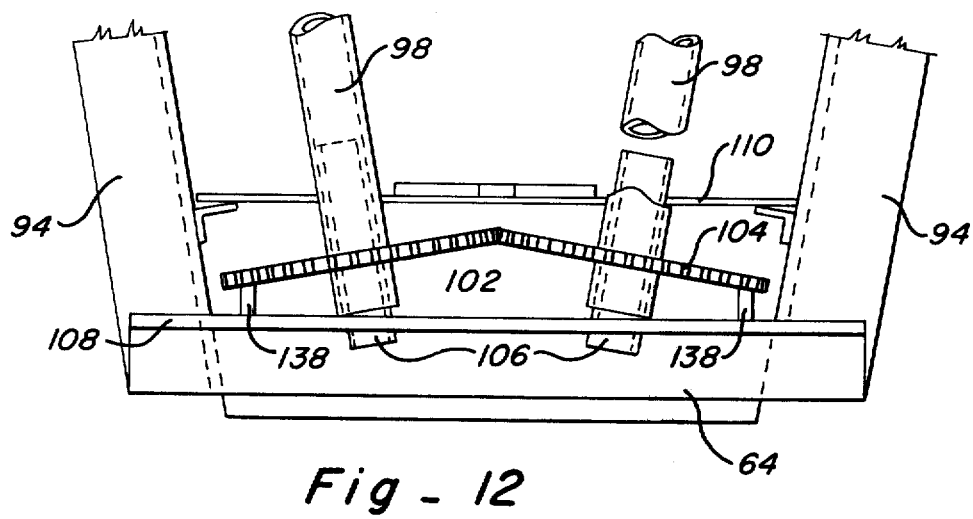
Fig_12
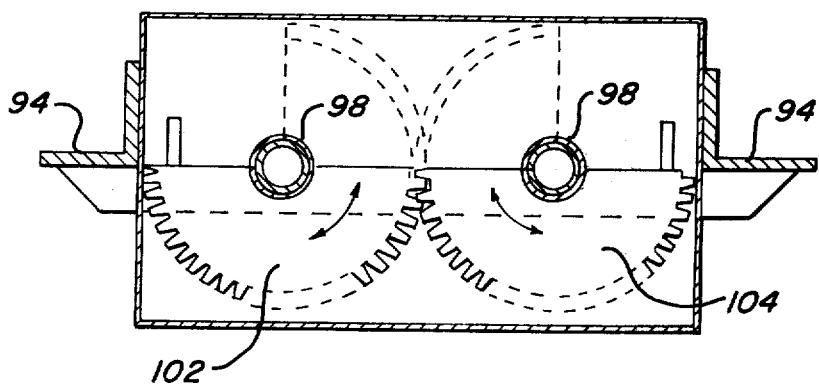
Fig_13

ANIMAL RESTRAINT

The present invention relates to an animal restraint. More particularly, it has to do with a restraint for selectively securing the neck of an animal such as a calf undergoing a process like branding or veterinary treatment. Still further, the basic neck restraint preferably is associated with a squeeze-type tilt table.

In the handling of livestock for such purposes as branding, brand inspection, pregnancy testing and the administration of medical treatment, it often is desirable to drive the stock through a chute to and into a clamping arrangement. With animals such as cattle, the clamping arrangement frequently includes a headgate which must securely and yet non-injuriously secure the neck of the animal so as to restrain further movement either forwardly or backwardly. One known type of neck clamp includes a pair of spaced generally upright tubes that are pivotally mounted at the bottom and affixed at the top to an arm assembly. By pulling on the arm assembly, the tops of the tubes are caused to move together so that the tubes may tightly clamp the neck of the animal.

Often associated with the headgate or neck clamp is a body press. This typically features a pair of spaceopposed panels again pivotally or hingedly mounted at their lower extremities and associated with a draw-arm or the like for moving their upper extremities toward and away from one another. Thus, the draw-arm may be manipulated to move the panels toward one another and thereby squeeze the body of the animal so as to immobilize the same. In many cases, one of the panels is composed of a plurality of usually upright slats at least most of which are individually removable, after the animal is clamped into place, for the purpose of exposing an enlarged body area for such reasons as placing a branding iron or effecting treatment or examination.

Another useful livestock-handling implement has been what has been referred to as a tilt table. This again includes a two-panel body press for initially immobilizing the animal. One of the panels is hinged to an adjacent bench structure. After the animal has been secured within the body press, the combination of the panels may then be tilted about a horizontal axis so as to cause the hinged one of the panels to swing over and lie flat on top of the bench structure. In this manner, the animal is caused to be lying on its side on top of the bench structure so as to facilitate branding or other operations. In this case, it is the panel which is uppermost after the tilting maneuver that is formed to have the aforementioned removable slats.

In another form of headgate, the upper ends of the two tubes are caused to swing toward and away from one another by an assembly that includes pulleys and interwined cable. A cable-operator is manipulated by the user so as to exert force in the cable and effect the tube movement.

The foregoing and similar prior arrangements have certainly found substantial utility. At the same time, however, many such assemblies have become rather costly, of excessively heavy weight and of such nature as to require frequent maintenance.

It is, accordingly, a general object of the present invention to provide a new and improved animal restraint which overcomes difficulties and deficiencies experienced with prior such restraints.

Another object of the present invention is to provide a new and improved animal restraint that includes a headgate and neck clamp which is capable of serving its function without injury to the animal while yet lending itself to simple, economical and dependable manufacture.

A further object of the present invention is to provide a new and improved animal restraint which advantageously combines both a headgate and neck clamp with a tilt-table form of body press.

An animal restraint in accordance with the present invention includes a pair of generally-upright elongated pipes spaced apart somewhat greater than the width of at least the head of an animal to be restrained. The pipes are mounted so as to permit rotation of each pipe about its longitudinal axis. A first spur gear is mounted on one of the pipes. Mounted on the other of the pipes is a second spur gear with both of these gears being sized and aligned so as to intermesh as a result of which each of the pipes is slaved to the other in rotation. A first elongated tube is secured to one of the pipes in generally-parallel spaced relationship. A second tube is coupled to the other pipe again in generally parallel spaced relationship and with the upper end of that tube being movable toward and away from that pipe. The upper end of the latter tube is urged in a direction away from its associated pipe. Finally, the restraint includes means for releasably latching the assemblies of the pipes and the tubes in a position such that the tubes are between the pipes.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a perspective view of an animal restraint constructed in accordance with the present invention;

FIG. 2 is another perspective view, taken from a different angle, depicting a different orientation of the main parts of the assembly shown in FIG. 1;

FIG. 3 is a front-elevational view of the animal restraint shown in FIGS. 1 and 2;

FIG. 4 is a plan view of the same animal restraint;

FIG. 5 is a side-elevational view of the animal restraint;

FIG. 6 is an enlarged cross-sectional view taken along the line 6—6 in FIG. 5;

FIG. 7 is a fragmentary cross-sectional view taken along the line 7—7 in FIG. 5;

FIG. 8 is a fragmentary cross-sectional view taken along the line 8—8 in FIG. 3;

FIG. 9 is a fragmentary cross-sectional view taken along the line 9—9 in FIG. 3;

FIG. 10 is a fragmentary cross-sectional view taken along the line 10—10 in FIG. 3;

FIG. 11 is a fragmentary cross-sectional view taken along the line 11—11 in FIG. 3;

FIG. 12 is an enlarged cross-sectional view taken along the line 12—12 in FIG. 4; and FIG. 13 is an enlarged fragmentary cross-sectional view taken along the line 13—13 in FIG. 3.

As disclosed herein, an animal restraint includes a headgate or neck clamp 20 secured to and associated with a body press 22 hinged to a bench 24 so as to constitute, with the bench, a tilt table. As shown in FIGS. 1 and 2, the overall restraint assembly is located at the head of a chute 26 which terminates, at the entrance to the livestock restraint, with the inclusion of a gate 28 capable of being opened and closed by means of a rope 30. In use, an animal such as a calf 32 is driven through chute 26 and within press 22 to a position at which its neck is secured with headgate 20. Once the animal is secured by headgate 20 and firmly clamped by body press 22, the entire assembly of the headgate and body press may be tilted from the FIG. 1 position to the FIG. 2 position.

Bench 24 includes spaced ground rails 34, in this case in the form of angle irons, joined by cross ties 36 formed from square tubing. Projecting upwardly from rails 34 are legs 38, at either end of ties 36, which are bent into or welded to horizontally disposed brace members 40 and table supports 42. Various struts 44 are affixed so as to triangulate the different ones of rails 34, ties 36 and posts 38 and thereby rigidify the total bench structure as illustrated particularly in FIG. 1. Ties 36, posts 38 and supports 42 preferably are all formed of square tubing, while struts 44 preferably are fabricated from round tubing.

Body press 22 includes a first panel 46 spaced opposite a second panel 48. Panel 46 is generally framed by a peripheral square tube 50 to which is secured a solid plate or table 52. Disposed horizontally across the side of panel 46 toward bench 24, and approximately midway of plate 52 in the upright direction, is a header 54. At its opposite ends, header 54 is pivoted to supports 42 by means of pins 56. Extending upwardly and centrally from the top portion of frame 50 is a U-shaped hoop 57 so as to be capable of being grasped by the user for the purpose of swinging panel 46 about pins 56 and cause plate 52 to lie in a horizontal position on top of bench 24 as shown in FIG. 2.

A loop 58 projects outwardly from header 54, the loop being secured at its own ends to header 54 and braced by a strut 60 that depends at an angle downwardly into engagement with a stud 62 affixed in an upright position across the middle of plate 52. Loop 58 enables the user to assist himself in the tilting of panel 46 by placing his foot on the loop while at the same time pulling upon hoop 57. At its bottom extremity, panel 46 is affixed to a baseplate 64. Plate 64 has a width sufficient to accommodate the feet of the animal to be restrained. Hinges 66 at the bottom of plate 48, and at the opposite side of baseplate 64 from the connection to panel 46, serve to permit opposing panel 48 to be swung toward and away from panel 46.

In itself, panel 48 includes a frame composed of an angle-iron 68 across its top and continued around the remainder of its extent by square tubing 70. Horizontally disposed toward the bottom portion of panel 48 is a hinge rod 72. The portion of panel 48 below rod 72 preferably is closed by wooden planking 73. Hingedly mounted from rod 72 and laterally spaced from each other are a plurality of upright slats 74. Each of slats 74 is receivable at its upper end against angle iron 68 in a position to be captivated by a gravity latch arm 76. Each arm 76 is pinned at its inner extremity to angle iron 68 and is notched, as at 77, so as to fit over the outward side of its slat 74. Thus, any one or more of slats 74 may readily be disengaged and moved outwardly, as shown for two of them in FIG. 2, so as to allow access to the restrained animal. The outer end portion of arm 76 is slanted upwardly so as to be cammed up by the upper slat end as the latter is moved to its latched position. A counterweight 78 is suspended from each arm 76 to maintain the latched condition even when panels 46 and 48 are swung over so as to lie on top of bench 24. A shoulder 79 on the counterweight assembly holds arm 76 in position to receive its slat when the latter is swung toward the latched condition.

Projecting upwardly from angle iron 68 is a handle 80. Downwardly depending within the center of handle 80 is a bifurcated hinge 82 within which is hingedly pinned one end of a draw-bar 84. Draw-bar 84 extends from its hinge across the top of the assembly from panel 48 to panel 46 where it passes under a guard 86. A series of longitudinally-spaced notches 88 in draw-bar 84 are engageable with a floating lock 90 pivoted from guard 86. A handle 92, on the outer end of draw-bar 84, permits locking adjustment of the degree of thrust of panel 48 against panel 46. Alternatively, draw-bar 84 is replaced by a flexible chain that extends from panel 48 through guard 86. In that case, lock 90 is modified into the form of a pin or slot which engages a chain link.

Numerous modifications are contemplated for a variety of different applications. In one, bench 24 is omitted, panel 46 is affixed along its lower margin to base 64 and the latter is mounted upon a ground support so that the entire body press or resulting squeeze chute is free-standing. For this version, the lower margin of panel 46 desirably may also be hinged to base 64 and draw-bar 84 replaced by a linkage having a centerpivot pair so as to be double acting to conjointly move both panels 46 and 48 toward or away from one another. Depending upon the particular version, one or both of the bottom margins of panels 46 and 48 may be coupled to base 64 so as to be adjustable laterally and thereby permit variation of the foot-space available for the animal. Whether such coupling is hinged or fixed, it may, for example, be in as simple a form as spaced laterally-disposed tubes encircled by sleeves that carry the panel or panels; pins disposed in mating apertures serve to lock the sleeves in selected positions on the tubes.

In accordance with a still further modification, the side margin of panel 48 remote from headgate 20 is swingably mounted to a hinge post that projects upwardly from base 64. The opposite side margin of panel 48 is releasably secured to a correspondingly disposed latchpost which may be a part of headgate 20. Thus, panel 48 may be swung outwardly to permit lateral exit of the animal from the body press. For the case in which bench 24 is omitted and the body press is free-standing, it is desirable that panel 46 is similarly mounted by hinges and releasably latched so as to permit selective exit of the animal from the opposite side of the apparatus.

Headgate 20 includes a generally-rectangular frame composed of somewhat upright angle irons 94 secured respectively at their bottom ends to base 64 and tied together between their upper ends by an angle-iron header 96. A pair of generally-upright elongated pipes 98 are spaced apart somewhat greater than the width of at least the head of animal 32 to be restrained. Pipes 98 are mounted so as to permit rotation of each pipe about its longitudinal axis. More particularly, pipes 98 are hollow and journaled at their upper ends on a downwardly depending pivot 100 affixed to the bottom side of header 96. At the bottom ends, each of pipes 98 carry a spur gear. Thus, one of the pipes includes a spur gear 102 secured, as by welding, to its lower end. The other of the pipes includes a spur gear 104 similarly affixed. The spacing of the pipes together with the sizing and alignment of the entire assembly is such that spur gears 102 and 104 intermesh. To that end, pipes 98 are journaled at their lower ends upon upright pinions 106 that are affixed to a subplate 108 carried within housing or base 64. The intermeshing of the two pipes 98 by means of spur gears 102 and 104 is such that each of the pipes is slaved to the other. Preferably, base 64 includes a cover plate 110 as well as associated end walls so as to protect spur gears 102 and 104, as well as the journals, from the affects of weather. A tension chain 111 provides adjustment for controlling the resistance of pipes 98 to rotational movement; chain 111 is secured at one end to one of pipes 98 and at the other to a tab on the adjacent angle iron 94 by a screw threaded into a nut.

Spaced inside of pipes 98 are a pair of tubes 112 that are in generally-parallel spaced relationship to the pipes. Each of tubes 112 is secured at its lower end to a lower portion of its associated pipe 98 by a pivotal coupling 114. One of tubes 112 is held at its upper end within a casing 116 by a pin 118 selectively locatable within casing 116 at a plurality of different positions of holes therein. The other pipe 112 is confined at its upper end within a similar casing 120 and urged, by a spring 122, away from its associated pipe 98 toward the center of the unit. Spring 122 provides sufficient resiliency to its associated one of tubes 112 as to permit an animal to insert its neck further between the bars while yet exhibiting sufficient resistance to constrain the animal, in view of its usually more narrow neck, from withdrawing its head from the headgate assembly.

Completing the headgate arrangement is a releasable latch assembly 124 that is capable of retaining the overall composite structure or assemblies of pipes 98 and tubes 112 in a latched condition. Assembly 124 has handles 126 swingable about a pivot rod 128 to move rigidly-connected locking plates 130 into or out of captivating engagement with the upper end portions of tubes 112. As shown particularly in FIGS. 8 and 9, latch assembly 124 includes overhead straps 132 and lower straps 134 that serve to tie the entire headgate assembly, including header 96, in a rigid structure. Moreover, compression springs 136, disposed between header 96 and plates 130, serve to maintain plates 130 in a normally locked position. On the other hand, plates 130 slant downwardly toward tubes 112 so that the latter may be swung into the locked position without requiring use of handles 126. That is, the upper ends of tubes 112, on movement toward the locked position, cam plates 130 upwardly until the latched position is reached. FIG. 9 depicts the position of handles 126 and plates 130 for allowing the headgate to be swung to the open position. Because each of spur gears 102 and 104 is a sector of angular extent, pipes 98 may be rotated through a range of approximately 90° to either side of a position at which tubes 112 are most closely together. Stops 138 project upwardly from base 64 and in the path of the gear sectors so as to limit their extent or range of angular movement.

A pivotally-mounted cross pipe 140 extends horizontally near the top periphery of panel 46. Pipe 140 is secured between angle iron 94 and stud 62. Outwardly projecting from pipe 140 is a hook 142. Extending also from pipe 140 is an operator 144 constrained in total movement by a captivator 146. Correlatingly disposed on a corner of one of supports 42 is a pointed catch 148. When panel 46 is tilted so as to lie flat on top of bench 24, hook 142 is in a position to be caught by catch 148. After the operation on the animal has been completed, it is then only necessary to flick operator 144 upwardly so as to release hook 142 from catch 148 and permit the entire tilt table to be returned to an upright position in terms of the animal.

Included in header 54 are a series of successively spaced sleeves 150. A suitably collared pipe 152 may be inserted through any one of sleeves 150 for the purpose of blocking movement of an extremity of the restrained and contained animal. When not in use, pipe 152 may be stored in a holder sleeve 154.

For the purpose of more easily distinguishing between similarly shaped parts having different functions, the foregoing description has rather abitrarily assigned such words as "pipe" and "tube" to respective members. The very same stock material might be used for the fabrication of both. Out of consideration of strength provided as against weight, cost and ease of manufacture, it is at least usually preferred that such members be of hollow cross-section. Nevertheless, those and similar words are to be defined in this application as also embracing other cross-sectional shapes as well as solid forms.

From the foregoing, it will be seen that a quite versatile animal restraint has been described. It serves, of course, the multiple purposes of head restraint, body restraint and tilt-table action. More particularly, all of this is accomplished with a minimum of different parts while yet insuring quite positive interaction between the different components. The latter is extremely important when it is considered that the animals may weigh many hundreds of pounds.

While a particular embodiment of the invention has been shown and described, and a number of alternative modifications have been presented, it will be obvious to those skilled in the art that changes and further modifications may be made without departing from the invention in its broader aspects, and, therefore, the aim in the appended claims is to cover all such changes and modifications as fall within the true spirit and scope of the invention.

I claim:
1. An animal restraint comprising:
a pair of generally-upright elongated pipes spaced apart somewhat greater than the width of an animal to be restrained;
means for mounting said pipes to permit rotation of each pipe about its longitudinal axis;
a first spur gear mounted on one of said pipes near one end thereof;
a second spur gear mounted on the other of said pipes near one end thereof, with both of said gears being sized and aligned to intermesh so that each of said pipes is slaved to the other in rotation;
a pair of elongated tubes;
means for securing one of said tubes to one of said pipes in generally-parallel spaced relationship;
means for coupling the other of said tubes to the other of said pipes in generally-parallel spaced relationship and with the upper end portion of said other tube being movable toward and away from said other pipe;
means for urging said upper end away from said other pipe;

and means for releasably latching the assemblies of the other ends of said pipes and the adjacent ends of said tubes in a closed condition in which said tubes are positioned between said pipes.

2. A restraint as defined in claim 1 in which said mounting means includes a generally-rectangular frame having a lower base and an upper header together with means in said base and header defining a plurality of pivots individually accommodating rotation of respective ones of the different ends of said pipes, the axes of said pivots being canted with respect to the vertical direction so as to orient said pipes to diverge apart in the upward direction.

3. A restraint as defined in claim 1 in which said spur gears are mounted on the lower end portions of said pipes, and in which said latching means engages said assemblies near the upper ends of said pipes and tubes.

4. A restraint as defined in claim 3 in which said mounting means orients said pipes to diverge apart in the upward direction, and in which said spur gears are canted downwardly and outwardly from one other.

5. A restraint as defined in claim 1 in which each of said gears is a sector of an angular extent permitting rotation of said pipes through a range approximately 90° to either side of a position at which said tubes are most closely together and in which said mounting means includes at least one stop disposed in the path of one of said gear sectors to limit said range.

6. A restraint as defined in claim 1 in which said coupling means includes a U-shaped rigid strap embracing said upper end portion of said other tube within its bight portion and having its leg-end portions affixed to the upper end portion of said other pipe, and which further includes a compression spring disposed within the legs of said strap and biasing said upper end portion of said other tube away from said upper end portion of said other pipe.

7. A restraint as defined in claim 1 in which said securing means includes a U-shaped rigid strap embracing the upper end portion of said one tube within its bight portion and having its leg-end portions affixed to the upper end portion of said one pipe, and which further includes means for securing said upper end portion of said one tube within said bight portion.

8. A restraint as defined in claim 1 in which said mounting means orients said pipes to diverge apart in the upward direction, and in which said securing means and said coupling means each effects a pivotal attachment of the lower ends of said tubes directly in juxtaposition to the corresponding ends of said pipes.

9. A restraint as defined in claim 1 which further includes a bench spaced to one side of and generally behind said pipes;
a table secured at one end to said mounting means and hinged to said bench for movement between a generally vertical position and a generally horizontal position on top of said bench;
a clamping frame having its lower edge portion hinged with respect to said table and having its upper edge portion swingable toward and away from said table to clamp an animal therewithin;
means for adjustably tying said frame to said table with an animal wedged therebetween;
and an automatically engageable and manually releasible latch means for securing said table in a horizontal position lying atop said bench.

10. An animal restraint comprising:
a pair of generally-upright elongated pipes spaced apart somewhat greater than the width of an animal to be restrained;
means for mounting said pipe to permit rotation of each pipe about its longitudinal axis;
a first spur gear mounted on one of said pipes;
a second spur gear mounted on the other of said pipes with both of said spur gears being sized and aligned to intermesh so that each of said pipes is slaved to the other in rotation;
a pair of elongated tubes;
means for securing one of said tubes to one of said pipes in generally-parallel spaced relationship;
means for coupling the other of said tubes to the other of said pipes in generally-parallel spaced relationship and with the upper end portion of said other tube being movable toward and away from said other pipe;
means for urging said upper end away from said other pipe;
means for releasably latching the assembly of said pipes and tubes in a closed condition in which said tubes are positioned between said pipes;
a bench spaced to one side of and generally behind said pipes;
a table secured at one end to said mounting means and hinged to said bench for movement between a generally vertical position and a generally horizontal position on top of the bench;
a clamping frame having its lower edge portion hinged with respect to said table and having its upper edge portion swingable toward and away from said table to clamp an animal therebetween;
means for adjustably tying said frame to said table with an animal wedged therebetween;
a plurality of successively-spaced generally upright posts hingedly mounted within said frame at their respective lower ends and each securable at its upper end by means of a gravity operated latch mechanism;
and means including a counterweight affixed to said latching mechanism for maintaining the upper end of the respective post in a latched condition when said table is in said horizontal position.

* * * * *